Figure 6:
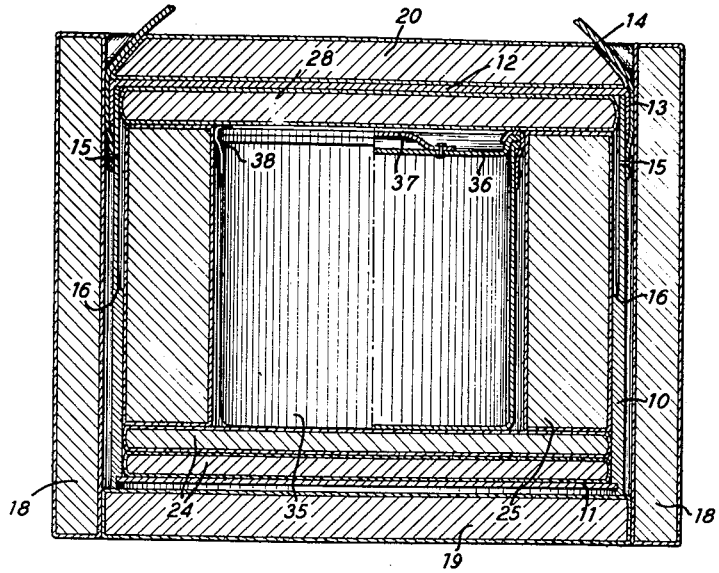

Nov. 22, 1955  C. F. GRAFF  2,724,494
FOOD CARRIERS
Filed March 24, 1953  2 Sheets-Sheet 1
FIG. 1
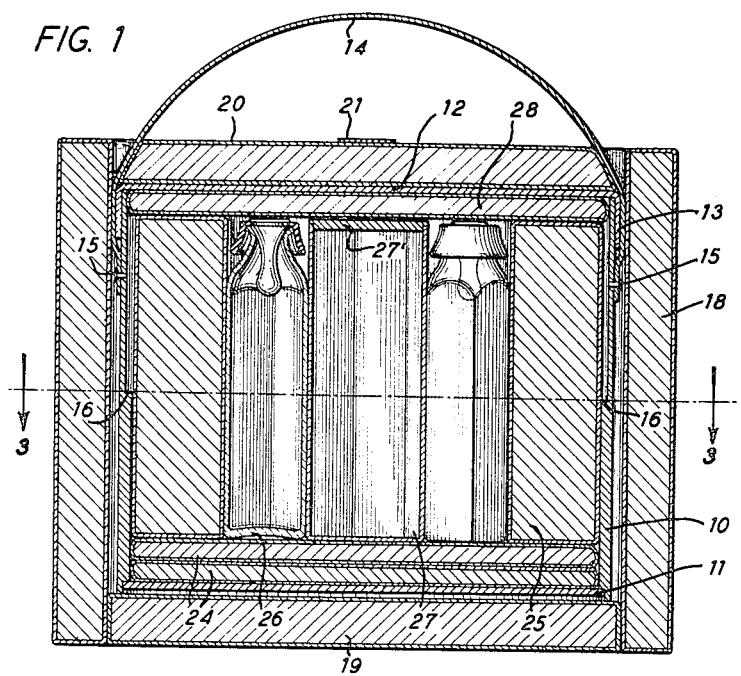
FIG. 2
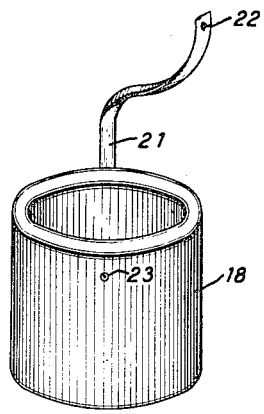
FIG. 3
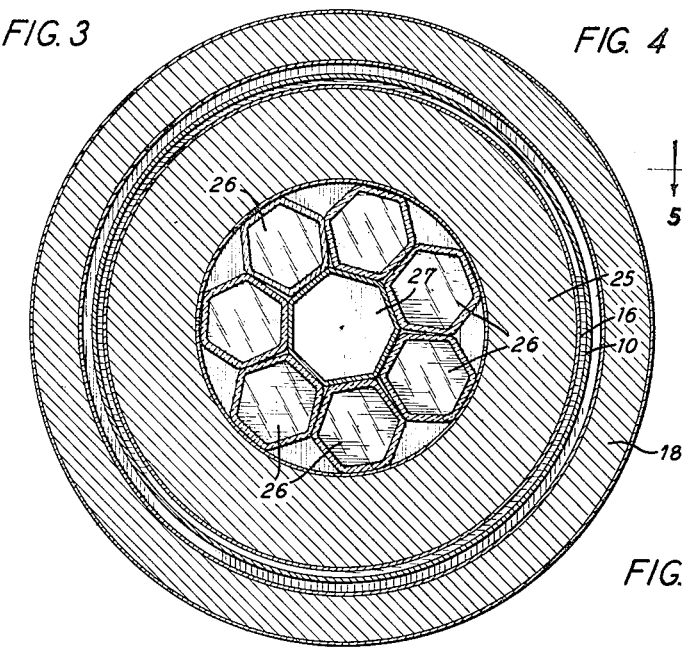
FIG. 4
FIG. 5
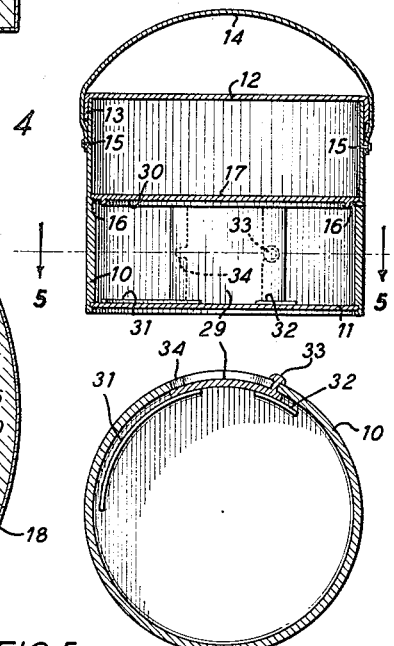
INVENTOR
CHRISTIAN F. GRAFF
BY *A. Yates Dowell*
ATTORNEY Nov. 22, 1955 C. F. GRAFF 2,724,494
FOOD CARRIERS Filed March 24, 1953 2 Sheets-Sheet 2

INVENTOR
CHRISTIAN F. GRAFF
BY A. Yates Dowell
ATTORNEY

United States Patent Office 2,724,494
Patented Nov. 22, 1955

2,724,494
FOOD CARRIERS
Christian F. Graff, Mechanicsburg, Pa.
Application March 24, 1953, Serial No. 344,276
8 Claims. (Cl. 206—4)

This invention relates to food carriers for use in the storage and transportation of various foods and for maintaining desired temperatures of such foods over extended periods of time.

Food carriers hitherto employed are subject to criticism for various reasons including the fact that they are expensive, bulky, awkward to handle and not adaptable to the storage and transport of different foods and the dishes or receptacles therefor; and, primarily, because they do not possess heat or cold retention sufficient for various desired purposes.

The inventor has found, by long-time and exhaustive tests, that the presence of air within a food carrier, even when double-walled and having air-space or insulating material between such walls, adversely affects the temperature of foods stored and carried therein to such an extent as to render the maintenance of desired heat or cold exceedingly difficult, if not impossible, over periods of time exceeding two or three hours, which is too short a between-meals period.

A primary object of the invention is, therefore, to provide the public with a food carrier so designed and insulated as to keep various foods, when set therein in their respective dishes or receptacles, palatably hot or cold for over six hours, an ample between-meals period; and so as to keep milk, when stored therein in baby bottles, hygienically cold for twenty-four hours.

Another object of this invention is to provide a food carrier from the interior of which air is excluded by the unique within-applied pliable insulation used for temperature control as later described.

Another object of this invention is to provide a food carrier which may be used for carrying foods, dished out ready to eat on dinner plates, for one or more persons, and which has facilities for making compartments of various sizes and is suitable for indoor and outdoor multi-uses, thus effecting a considerable monetary saving to individual users and a vast monetary saving to Nation-wide users in the aggregate.

Another object of this invention is to provide an attractive food carrier which is relatively inexpensive, simple, easy to produce, easy to carry, easy to operate, and which may be readily modified to accommodate numerous and various foods, dishes, receptacles, and uses.

Figure 7:
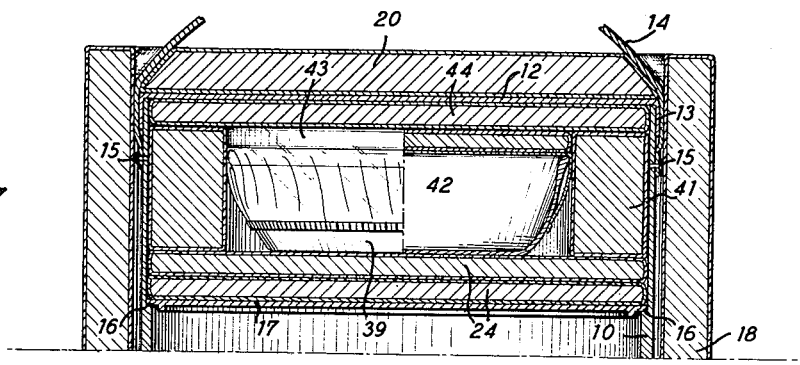
Figure 8:
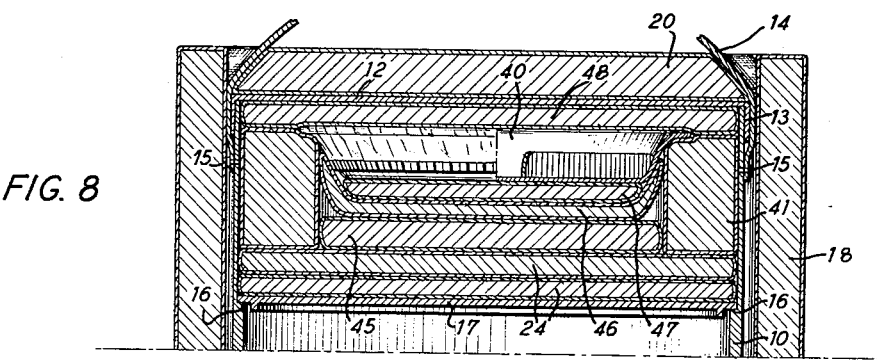

Further objects and advantages of this invention will become apparent from the following description taken in conjunction with the accompanying drawings, wherein:

Fig. 1 is a vertical section of a food carrier in accordance with the present invention, and used for storing or carrying babies' milk bottles;

Fig. 2, a perspective on a reduced scale of the outer case of Fig. 1;

Fig. 3, a horizontal section on the line 3—3 of Fig. 1;

Fig. 4, a vertical section of the carrier per se;

Fig. 5, a horizontal section on the line 5—5 of Fig. 4;

Fig. 6, a vertical section similar to Fig. 1, but with a picnic pail replacing the milk bottles;

Fig. 7, a similar fragmentary section of the upper portion of the device showing the method of carrying a bowl; and Fig. 8, a similar view carrying a food or dinner plate, shown one-half in elevation and one-half in section.

Briefly stated, the invention comprises a cylindrical pail or container having a lid and a bail which serves not only as a means by which the container may be carried, but for maintaining the lid on the container. Within the container are a number of insulating elements in the form of sleeves, disk pads, and partition members of a character such that, when they are assembled, they will serve to exclude air from the interior of the container. Further, for use in long-time storage or extreme weather, a case for the container is provided in the form of an insulating sleeve with a bottom and an insulating disk pad for the lid, the sleeve being of such size as to snugly receive the container when set therein and having a strap, permanently attached by one end but loose for detachable connection by the other end, for maintaining the parts in assembled relation while permitting the bail to extend upwardly so that the container may be carried thereby. The container is adapted for carrying baby milk bottles, bowls, dinner plates and receptacles for various foods, liquid or solid, hot or cold, being multi-purpose; and it may be used with or without the above-referred to insulating case.

With continued reference to the drawings, the invention comprises a container having a cylindrical wall 10, Fig. 1, a bottom end wall 11, and a top end wall or lid 12 including tight fitting pendant flange 13. A bail 14 is mounted on pivots 15 and, due to its snug fit, the bail serves to hold lid 12 in place. The interior of the container is provided with an annular shoulder 16 for the reception of a partition 17 as shown in Fig. 4, and the use of which will be later described.

In order to assist in retaining heat or cold within the container as, for instance, in extreme weather, a case of insulation is provided, such case comprising a sleeve 18 with a bottom 19 and a removable top or disk pad 20 which fits within bail 14 when the latter is raised. The internal diameter of sleeve 18 is so near that of the external diameter of the container that they tend to remain in assembled relation when the container is carried by its bail. However, to insure that the parts be maintained in assembled relation, a strap 21 is employed, such strap being permanently fixed at one end to sleeve 18 and having its opposite end loose and provided with the receiving portion 22, Fig. 2, of a snap fastener which grips the received portion 23 of the same when the strap is attached. Such strap 21 is shorter than bail 14, and, when attached, extends directly and closely across the top of sleeve 18 and disk pad 20.

The structure described may be used for carrying substances the temperatures of which, whether hot or cold, are to be maintained over substantial periods of time, and it is adapted for numerous types of materials, and receptacles in which they are held, by the use of a partition for maintaining compartments, an upper and a lower, at different temperatures.

In Fig. 1, the invention is illustrated as being employed for the maintenance of hygienically cold temperature in babies' milk bottles for round-the-clock feeding. In order to accommodate the bottles, one or more disk pads 24 are placed in the bottom of the container and upon these is placed insulating sleeve 25 open at both ends. Within this sleeve 25 is then set a central multi- and flat-sided receptacle 27, seven sides being shown in Fig. 3, of baby-milk-bottle height and with lid 27', which receptacle has a form similar to that of a multi- and flat-sided baby milk bottle, and which receptacle has good temperature-conducting qualities as, for example, aluminum, and which receptacle, in this particular employment of bottled cold milk, has been filled with crushed ice, but may be filled with other temperature-influencing media. Multi- and flat-sided baby milk bottles, of which seven are shown, Fig. 3, are then set around receptacle 27 in series and side-to-side close contact, while the bottles, in turn, are tightly encased by pliable sleeve 25 so that air pockets are minimized. Over the tops of sleeve 25 and bottle assembly 26 is then placed disk pad 28, lid 12 applied, and bail 14 raised as shown in Fig. 1. Container 10, with its contents, is then set down into case 18, disk pad 20 applied, and strap 21 attached snugly across the top of the structure at right angles to and beneath raised bail 14, whereupon the carrier will maintain properly precooled milk below the hygienically required low temperature for twenty-four hours, even in hot weather.

In Fig. 4 is disclosed the use of a removable partition 17 in order to provide an upper and a lower compartment in the container. A small inside-sliding arcuate door 29 is provided for the lower compartment, which door slides behind an upper retaining rib 30 on the under surface of the partition 17 and lower retaining ribs 31 and 32, the door being provided with an operating knob 33 adapted to be received within a slot 34 in wall 10 of the container.

With the structure described, readily accessible upper and lower compartments are provided. The use of the upper or hot compartment to carry material, the temperature of which is to be maintained sufficiently high, will be subsequently described. The lower or cool compartment may be used for storing or carrying a Thermos bottle and utensils, bread, desserts, fruits, or other foods for which there is no need of maintaining a temperature other than atmospheric.

Instead of the milk-bottle assembly used in the container of Fig. 1, another type of device may be carried, such as, for example, a deep picnic pail 35, Fig. 6, having a lid 36 and a lid handle 37, the lid being held in place by means of pivoted clamps 38. Otherwise, the structure of Fig. 6 is the same as that of Fig. 1. The pail 35 may of course contain any desired substance, solid or liquid, hot or cold.

In Figs. 7 and 8, the upper portion of the structure of Fig. 4 is employed to illustrate how the within-applied insulation of the food carrier may be modified to maintain the desired temperature in either a bowl 39 or a plate 40. In either case, on the partition 17 are placed a couple of disk pads 24 upon which is placed a relatively short insulating sleeve 41 within which, in Fig. 7, bowl 39 is set upon pads 24, such bowl having a bowl cover 42. Over bowl 39 with its bowl cover 42 is then placed a relatively small disk pad 43 of diameter slightly greater than the internal diameter of sleeve 41 and over this pad is placed another disk pad 44, the diameter of which corresponds to the internal diameter of the container, such pad being slightly thicker than, but interchangeable with, pads 24. Thereafter, lid 12 is applied. In Fig. 8, to accommodate shallow, or dinner, plates, after disk pads 24 and insulating sleeve 41 are placed, a disk pad 45 is added and on this is applied a thinner, larger disk pad 46 and a smaller disk pad 47 on which plate 40 is set and pressed down to exclude air. Thereafter, disk pad 48 (similar to pad 44 illustrated in Fig. 7) and lid 12 are applied.

It will be readily understood that the present invention contemplates the accommodation of hot or cold, liquid or solid, foods of various kinds in receptacles also of different kinds and character and that, due to the substantial exclusion of air by means of the unique within-applied pliable and adjustable insulation, the contents of the receptacles will be maintained at relatively high or low temperatures for many hours.

The container may be of any desired material such as, for example, plastic, while the insulation may likewise be of any desired material, such as, for example, and preferably, Fiberglas, encased in a suitable film or other material.

It will be obvious to those skilled in the art that various changes may be made in this invention without departing from the spirit and scope thereof and therefore the invention is not limited by that which is shown in the drawings and described in the specification but only as indicated in the appended claims.

What is claimed is:

1. A food carrier comprising a cylindrical container of plastic or other suitable material, a flanged lid on said container, a bail pivoted on said container and snugly engaging said lid for maintaining the lid tightly on the container, insulating members at the top and bottom of said container, an insulating sleeve within the interior of the container, a case about the exterior of said container including an insulating sleeve, an insulating bottom at the lower end of said sleeve, a removable insulating member resting on the lid of said container, a strap passing closely over said member at a right angle to the raised bail, said strap having one end fixed to said insulating sleeve and its other end loose for detachable connection with said sleeve on substantially the diametrically opposite side of said sleeve, whereby, when fastened, said strap will engage the insulating member upon the lid of the container and retain the container within its receiving case when carried.

2. The structure of claim 1 having therein a multi- and flat-sided receptacle of form similar to that of a multi- and flat-sided baby milk bottle, with a circular series of such baby bottles closely encircling said receptacle in side-to-side close contact, said receptacle being adapted to contain crushed ice or other media for influencing the temperature of the contents of said bottles.

3. The structure of claim 1 and a receptacle disposed centrally therein.

4. A food carrier comprising a container, a lid on said container, a bail pivoted on said container and snugly engaging and maintaining said lid tightly on said container, insulating members at the top and bottom of the interior of said container, an insulating sleeve within the interior of the container, an insulating sleeve about the exterior of said container, an insulating bottom at the lower end of said sleeve, a removable insulating member at the top of said container, a strap having one end fixed to said last-mentioned sleeve and its other end loose for detachable connection with said sleeve on substantially the diametrically opposite side of said sleeve, whereby, when fastened, said strap will engage the insulating member for the top of the container and retain the container within its receiving sleeve.

5. The structure of claim 4 with the addition of a multi-sided receptacle within the interior insulating sleeve of the container and a series of multi-sided baby bottles encircling said receptacle, said receptacle being disposed within the space defined by said bottles and being adapted to contain temperature-influencing means for influencing the temperature of the contents of said bottles.

6. A food carrier comprising a container, a lid on said container, a bail pivoted on said container and snugly engaging and maintaining said lid tightly on said container, a removable horizontal partition defining upper and lower compartments, means for supporting said partition within said container, said container being provided with a door for said lower compartment, insulating members at the top and bottom of the interior of the upper compartment of said container, an insulating sleeve within the interior of said compartment and about the sides of the container, an insulating sleeve about the exterior of said container, an insulating bottom at the lower end of said sleeve, a removable insulating member resting on the lid of said container, a strap passing closely over said member at right angles to the raised bail, said strap having one end fixed to said last-mentioned sleeve and its other end loose for detachable connection with said sleeve on substantially the diametrically opposite side of said sleeve whereby, when fastened, said strap will engage the insulating member upon the lid of the container and retain the container within its receiving case when carried.

7. A food carrier comprising a cylindrical container closed at one end and having a removable lid on the other end, insulating cylindrical sleeves both interiorly and exteriorly of the container, a shoulder formed in said container on the inner periphery thereof for receiving and retaining a partition in definite relation, a horizontal partition having a retaining rib projecting downwardly therefrom and spaced inwardly from the inner periphery of the container, said container having an opening in its cylindrical side wall between the partition and the bottom wall of the container, a sliding arcuate door positioned between the side wall of the container and the rib on said partition whereby said door may slide to close the opening or may slide to provide access to the interior of the container.

8. The invention according to claim 7 in which a retaining rib is provided on the bottom wall for guiding the lower edge of the sliding door.

References Cited in the file of this patent

UNITED STATES PATENTS

| | | |
|---|---|---|
| 686,841 | Bertels | Nov. 19, 1901 |
| 723,854 | Frank | Mar. 31, 1903 |
| 1,625,002 | Wagner | Apr. 19, 1927 |
| 2,352,066 | Apfelbaum | June 20, 1944 |
| 2,464,069 | Benson | Mar. 8, 1949 |
| 2,465,910 | Mills | Mar. 29, 1949 |
| 2,598,995 | Graff | June 3, 1952 |
| 2,645,332 | Martin et al. | July 14, 1953 |
| 2,652,698 | Schlumbohm | Sept. 22, 1953 |